(12) United States Patent
Li et al.

(10) Patent No.: US 11,137,735 B2
(45) Date of Patent: Oct. 5, 2021

(54) METHOD FOR CONTROLLING A PLC USING A PC PROGRAM

(71) Applicant: Brooks Automation GmbH, Radolfzell (DE)

(72) Inventors: Fan Li, Aach (DE); Herve Guichardaz, Rielasingen-Worblingen (DE)

(73) Assignee: Brooks Automation (Germany) GmbH

( * ) Notice: Subject to any disclaimer, the term of this patent is extended or adjusted under 35 U.S.C. 154(b) by 0 days.

(21) Appl. No.: 16/619,020

(22) PCT Filed: Jun. 6, 2018

(86) PCT No.: PCT/EP2018/064936
§ 371 (c)(1),
(2) Date: Dec. 3, 2019

(87) PCT Pub. No.: WO2018/224568
PCT Pub. Date: Dec. 13, 2018

(65) Prior Publication Data
US 2020/0174438 A1    Jun. 4, 2020

(30) Foreign Application Priority Data
Jun. 7, 2017 (EP) .................. 17174804

(51) Int. Cl.
*G05B 19/05* (2006.01)
*G06F 9/44* (2018.01)
(Continued)

(52) U.S. Cl.
CPC ......... *G05B 19/056* (2013.01); *G05B 19/054* (2013.01); *G05B 19/058* (2013.01); *G06F 8/51* (2013.01)

(58) Field of Classification Search
CPC .... G05B 19/05; G05B 19/056; G05B 19/054; G05B 2219/25428; G05B 19/02;
(Continued)

(56) References Cited

U.S. PATENT DOCUMENTS 9,921,565 B2 *  3/2018  Ikegami ............... G05B 19/056
2014/0123104 A1  5/2014  Frohberger et al.
(Continued)

OTHER PUBLICATIONS

Dai et al., Migration From PLC to IEC 61499 Using Semantic Web Technologies, 15 pages (Year: 2014).*
(Continued)

*Primary Examiner* — Thuy Dao
(74) *Attorney, Agent, or Firm* — Perman & Green, LLP; Colin C. Durham

(57) ABSTRACT

The present disclosure relates to a method for controlling a PLC using a PC program, wherein a source code of a PLC program includes a data section, the data section including data indicating services to be exposed by the PLC when running the PLC program, wherein a source code of the PC program is automatically generated using the data included in the data section and a PC program template, wherein the PLC is controlled using the PC program generated from the automatically generated source code of the PC program.

13 Claims, 3 Drawing Sheets

(51) Int. Cl.
*G05B 19/042* (2006.01)
*G06F 8/51* (2018.01)

(58) Field of Classification Search
CPC .......... G05B 19/0426; G05B 19/41845; G05B 15/02; G05B 2219/23258; G05B 2219/23261; G05B 19/058; G05B 23/0213; H04B 3/54; H04B 3/542; G06F 8/51; G06F 8/60; G06F 8/38
See application file for complete search history.

(56) References Cited

U.S. PATENT DOCUMENTS

2014/0343696 A1    11/2014  Plache et al.
2017/0262436 A1*  9/2017  Uchida ................... G06F 16/22

OTHER PUBLICATIONS

International Search Report dated 15 Aug., 2018; International Application No. PCT/EP2018/064936.

* cited by examiner

METHOD FOR CONTROLLING A PLC USING A PC PROGRAM

CROSS-REFERENCE TO RELATED APPLICATIONS

This application is a National Stage of International Application No. PCT/EP2018/064936, having an International Filing date of 6 Jun. 2018, which designated the United States of America, and which International Application was published under PCT Article 21(2) as WO Publication No. 2018/224568 A1, which claims priority from and the benefit of European Patent Application No. 17174804.9 filed on 7 Jun. 2017, the disclosures of which are incorporated herein by reference in their entireties.

BACKGROUND

1. Field

The present disclosure relates to a method for controlling a PLC using a PC program, and a computer and a computer program for performing this method.

2. Brief Description of Related Developments

A PLC (Programmable Logic Controller) is a device for controlling process plants or machineries and is digitally programmed. A PLC usually has inputs, outputs, a firmware (operating system) and an interface for downloading the application program. The application program defines how the outputs are set depending on the inputs. The firmware makes available the inputs and outputs for the application program.

The PLC as a real time system connects with digital or analog sensors, and controls the actuators such as pneumatic or hydraulic cylinders or electrical motors of the process plant or machinery. For many machine control applications, especially semiconductor manufacturing machine applications, there is typically a personal computer (PC) application connected to the PLC and also the factory network (e.g. host system in a semiconductor fabrication plant, also known as a fab or foundry): it reads these sensor values from PLC, performs high level management on these acquired real time data (e.g. sends these data to the fab host as status variables), and sends commands to the PLC to perform respective actions.

US 2014/343696 A1 discloses a control environment, which can be embodied as a PLC and which controls operation of equipment like a production process. A rendering environment is provided for displaying industrial automation data. The control environment can comprise machine-executable control code that controls the operation of equipment A terminal of the rendering environment includes processor(s) to execute computer-executable code instructions.

US 2014/0123104 A1 discloses a method for the programming and configuration of a programmable logic controller, comprising; locating a configuration tool in a programming tool, wherein the configuration tool includes a module in an IEC61131 language; integrating at least one further module into the configuration tool; and executing the programming and configuration of the programmable logic controller in a high-level language using a C-Code editor; and wherein the at least one further module is configured to provide a definition of interfaces between an IEC61131 code and a high-level language code and a configuration of the high-level language code.

In a classical PC application, the problem is that whenever there is an evolution on the PLC application side, e.g. adding a new sensor or adding a new actuator, there is also a considerable amount of modification work on the PC application side to implement the basic functions to access these newly added elements, for example:

Create/modify documentation of the PLC interface regarding the newly added sensors/actuators that PC can access Add additional communication links between the PLC and PC application for the newly added elements Create internal variables/procedures in the PC program which represents the newly added elements Create/modify graphic user interface of the PC program to display the newly added sensors, and to provide the possibility to send command to the PLC to control the newly added actuators One can expose internal variables of the PLC to the PC for reading and/or writing, using e.g. an OPC server. However, even then the PC program has to be adapted manually to use newly provided variables.

It is thus desirable to reduce the necessary work involved in adapting the PC program to evolutions on the PLC application side.

SUMMARY

According to the present disclosure, a method, a computer program and a computer for controlling a PLC using a PC program with the features of the independent claims are proposed. Advantageous further developments form the subject matter of the dependent claims and of the subsequent description.

This present disclosure introduces a method and its implementation to automatically generate a PC program, preferably having a graphical user interface (GUI), for communicating with and/or controlling the PLC based on data read out from a data section of the source code of the PLC program and a PC program template. In other words, the data section serves as a common source code portion for both the PC program and the PLC program. Thus, errors introduced by manually adapting the PC program to evolutions on the PLC application side can be prevented. Within the PLC program, the data section includes data indicating or declaring, respectively, services to be exposed by the PLC when running the PLC program, and can be used by a corresponding service exposing procedure; within the PC program, these data can be used to know which services are actually exposed and can be used by a corresponding service connecting procedure, and preferably can be used by a GUI creating procedure in order to create visual elements (input or output) for every exposed service.

The present disclosure intends to save development time on the PC program side when there is an evolution or change on the PLC program side that requires the PC to implement these changes too. The PLC program side, i.e. the source code of the PLC program, still has to be adapted; however, the PC program does not require any further development. If the PLC program source code is defined or changed, only the changed data section has to be combined with the PC program template to create a new PC program source code. This saves significant development time on the PC side, avoids human errors and performs automatic functionality coherence check.

The present disclosure can be used advantageously in the frame of 'supervisory control and data acquisition' (SCADA). SCADA is a control system architecture that uses PCs, networked data communications and graphical user interfaces for high-level process supervisory management, but uses other peripheral devices such as PLCs and discrete PID controllers to interface to the process plant or machinery. The operator interfaces which enable monitoring and the issuing of process commands, such as controller set point changes, are handled through the SCADA supervisory computer system. However, the real-time control logic or controller calculations are performed by networked modules which connect to the field sensors and actuators.

According to a preferred aspect of the present disclosure, the source code of the PLC program is a high-level programming language, especially C-based or languages defined in IEC 61131-3. IEC 61131-3 is the third part (of 10) of the open international standard IEC 61131 for programmable logic controllers. Part 3 of IEC 61131 deals with basic software architecture and programming languages of the control program within PLC. It defines two graphical and two textual programming language standards, namely Ladder diagram (LD), graphical; Function block diagram (FBD), graphical; Structured text (ST), textual; Instruction list (IL), textual It is very convenient when the creation of the PLC program is performed on a PC using a PLC programming toolkit. The PLC programming toolkit can be different from a programming toolkit for programming the PC program; however, the advantage of the invention is that it shares a common file to conquer any language barrier between PLC and PC programming. In the PLC program, this file is part of the source code; in the PC program, this file is an input for generating program automatically. The present disclosure improves and simplifies code generation by providing source code that is relevant to both PC and PLC programs only once. The present disclosure proposes a modularisation of the source codes of both the PC and PLC program in such a way that at least one module, here the data section in the meaning of the present invention, is only provided once and used twice, i.e. when creating both programs.

Advantageously, the data section can be provided in the form of a separate file. This makes the use of the data section in connection with the PLC program source code and the PC program source code very easy. Preferably, the data section is a header of the source code of the PLC program, and is more preferably provided in the form of a separate header file.

Preferably, the PC program template is a text template. Thus, in connection with the data section from the source code, which is also textual, the source code of the PC program can be automatically generated very easily. Especially, any known code generation tool can be advantageously used, such as the so called "Text Template Transformation Toolkit" (T4) provided by Microsoft. T4 can be used by developers as part of an application or tool framework to automate the creation of text files with a variety of parameters. These text files can ultimately be provided in any text format, such as code (for example C-based like (Visual) C # or BASIC-based like Visual Basic), XML, HTML or XAML.

In order to enable the PC program to fully communicate with the PLC, controlling the PLC using the PC program preferably comprises writing values to the PLC and/or reading values from the PLC. In a typical PLC, many different variables are stored in the memory having specific values during runtime which define eventually the operation of the PLC. Thus, reading and writing such values is a basic method for controlling a PLC. Further advantageously, controlling the PLC using the PC program comprises receiving information from the PLC and/or sending commands to the PLC.

In order to enable the PLC to be controlled by the PC program, the services to be exposed by the PLC preferably comprise at least one service for writing data to the PLC and/or at least one service for reading data from the PLC. These services advantageously enable the PC program to write values to the PLC and/or to read values from the PLC and thus control the PLC.

According to a preferred aspect of the present disclosure, the services are exposed by the PLC using a server running on the PLC, e.g. an OPC (especially according to OPC UA), PVI, ProfiNet etc. server. These are well-tried solutions for exposing different services to clients, especially for reading values (especially measured values) from the server and/or writing values (especially set values) to the server, i.e. PLC. Additionally, for connecting to the exposed services, third-party procedures and clients can be advantageously used, e.g. the so called PVI (Process Visualization Interface) from B&R. PVI is software which can be run on a PC and connects to a PLC for receiving data. The PC program can use PVI as an auxiliary tool to connect to the PLC.

A computer program according to the present disclosure comprising a program code causes a computer to perform all steps of one of the methods according to the invention, when the computer program is run on the computer. Suitable non-transitory machine readable media for providing the computer program are particularly floppy disks, hard disks, flash memory, EEPROMs, CD-ROMs, and DVDs etc. A download of a program on computer networks (Internet, Intranet, etc.) is advantageous.

BRIEF DESCRIPTION OF THE DRAWINGS

Further advantages and aspects of the present disclosure will become apparent from the description and the appended figures.

It should be noted that the previously mentioned features and the features to be further described in the following are usable not only in the respectively indicated combination, but also in further combinations or taken alone, without departing from the scope of the present disclosure.

In the drawings:

FIG. 1 shows an exemplary machine comprising a process chamber and a number of sensors and actuators controlled by a PLC.

FIG. 2 shows schematically a data section according to a preferred aspect of the present disclosure.

FIG. 3 shows schematically the process of creating a PC program using a header file and a PC program template according to a preferred aspect of the present disclosure.

FIG. 4 shows schematically the process of creating a PLC program using a header file and a PLC main program file according to a preferred aspect of the present disclosure.

DETAILED DESCRIPTION

Figure 1:
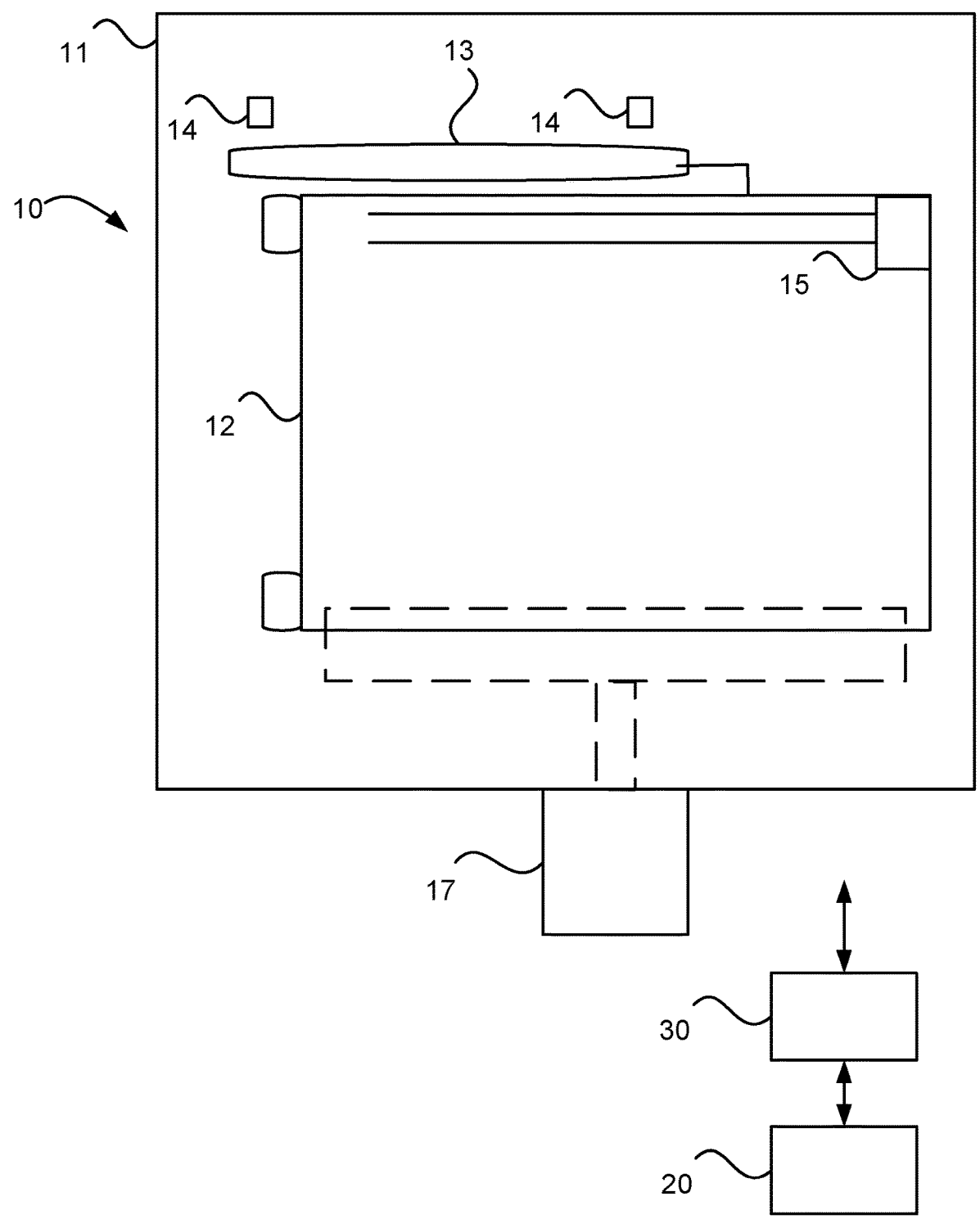

FIG. 1 schematically shows a machine 10 which can be part of an automated cleaning and inspection system for substrate carriers (e.g., semiconductor wafer carriers, flat panel display carriers, reticle carriers, and other carriers for electronic device manufacture) used in a manufacturing process. The machine 10 comprises a process chamber 11 having a door 12 and an actuator 13 configured here as a pneumatic cylinder for opening and closing the door. Two sensors 14 are provided for detecting the actuator's position to determine whether the door 12 is open or closed.

In the process chamber 11, there is provided a heater 15 to heat the chamber up to a desired temperature and a rotatable plate being rotated by an electromotor 17 with a desired speed.

The sensors 14 and actuators 13, 15, 17 are connected with a PLC 30 for controlling the process. The PLC 30 is in turn connected with a PC 20 for controlling the PLC, e.g. sending commands to and retrieving data from the PLC.

Figure 2:
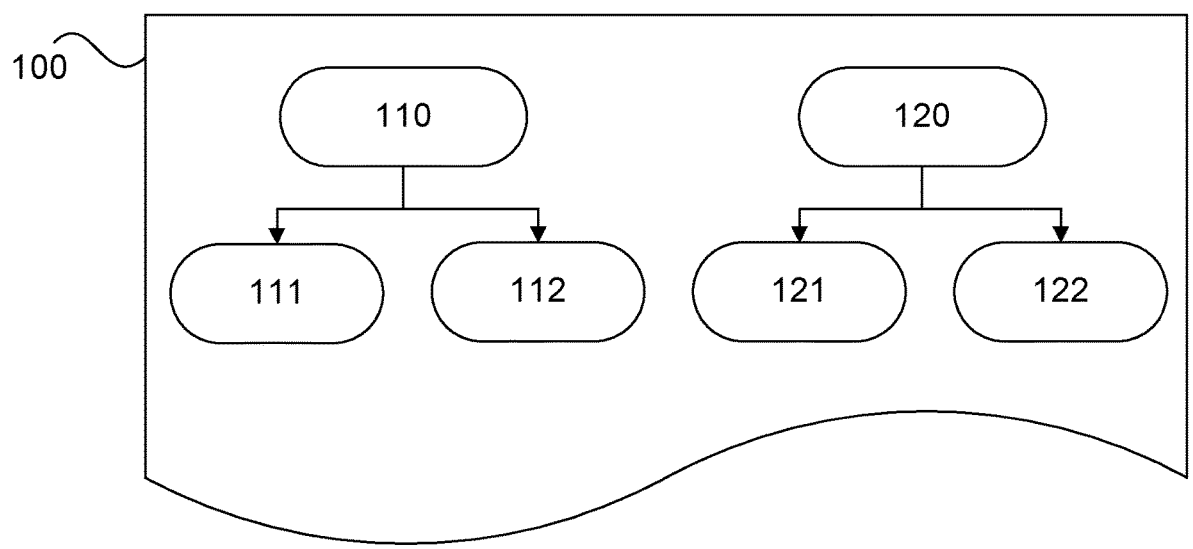

FIG. 2 schematically shows a data section 100 of a PLC program with internal blocks for indicating different services. Preferably, the data section is a header of the PLC program. Thus, the data can be read-out in a reliable and straightforward way.

As explained, the services exposed by the PLC can comprise at least one service for writing data to the PLC and/or at least one service for reading data from the PLC. Thus, practically, the data section includes one section or block 110 for the services for writing data to the PLC ("CONTROL") and one block 120 for the services for reading data from the PLC ("INFO").

Likewise, block 110 can be divided into two sub-blocks 111, 112 relating to commands and parameters, respectively. E.g. in sub-block 111 possible commands to the PLC, i.e. incoming data from the PC to start an action of the equipment (e.g. open/close a door, start/stop a process), can be indicated, and in sub-block 112 possible writable parameters, i.e. incoming data from the PC to set the parameters related to the machine, can be indicated.

Essentially, there are two types of parameters: equipment related parameters wherein a specific equipment component is related to the command (e.g. desired speed for "Rotate Table" command), and process related parameters wherein constraints of certain process (e.g. desired temperature for "Run Process" command) are related to the command.

Block 120 can be divided into two sub-blocks 121, 122 relating to process results and equipment status, respectively. E.g. in sub-block 121 possible readable process results, i.e. outgoing data sent to the PC to report the result of the process (e.g. measured average/min/max temperature of the "Run Process" command, and the evaluation of the result according to the parameter "Desired Temperature"), can be indicated, and in sub-block 122 possible readable equipment status data, i.e. outgoing data sent to the PC to report the equipment status (e.g. door open/close status) and equipment fault status (if there is any) can be indicated.

In the given example of FIG. 1:
PC can request PLC to OPEN or CLOSE the chamber (2 commands)
PC is informed of the status of the door being either OPEN or CLOSED (2 equipment status)
PC can request PLC to start a process (1 command) with desired temperature and electromotor speed (2 command parameters)
PC is informed of the min/max/average temperature during the process when the process is finished (1 process result)

A preferred header relating to this example is shown in the appendix. The header file is designed manually according to the desired equipment functionalities. It provides the interface and fully specifies all capabilities of the controlled PLC equipment to the PC program.

Figure 3:
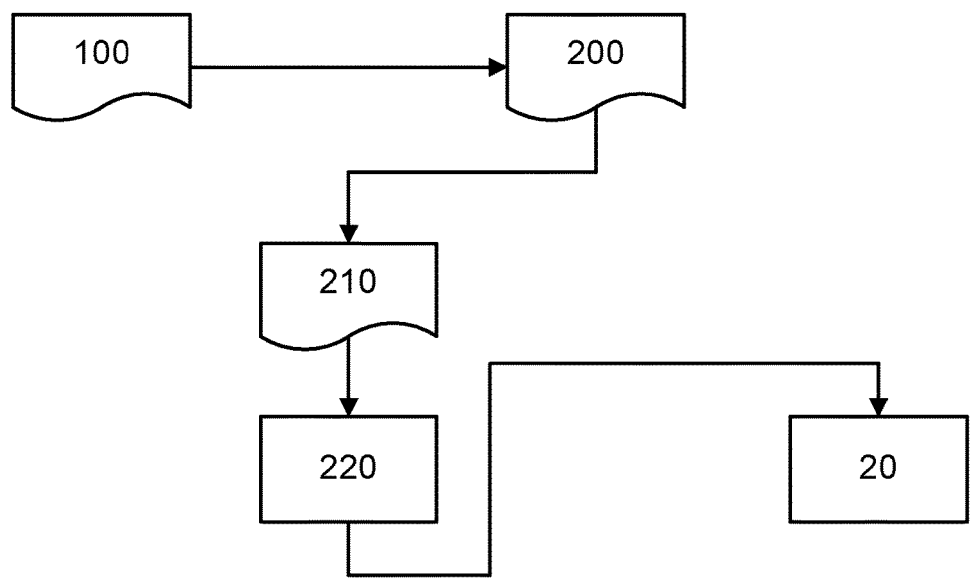

On the one hand, this header file is used to create a PC program as shown in FIG. 3. On the other hand, this header file is also used to create a PLC program as shown in FIG. 4.

Referring now to FIG. 3, the header file 100 is used together with a PC program template 200 to generate a PC program source code 210. The PC program source code 210 can be compiled to create a PC program 220 which can be run on the PC 20 to control the PLC 30. Preferably, the PC program 220 is configured to show a graphical user interface when run on the PC 20.

Figure 4:
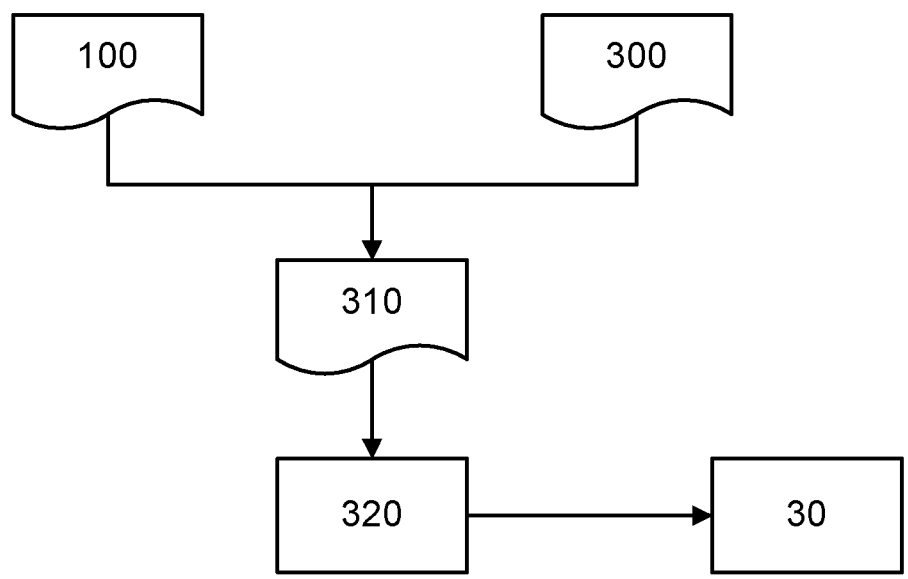

Referring now to FIG. 4, the header file 100 is also used together with a corresponding PLC program source code 300 to generate a PLC program source code 310. The PLC program source code 310 can be compiled to create a PLC program 320 which is transferred to the PLC 30 and run to control the process and simultaneously expose the services declared in the header file 100 to be connected to by the PC program.

Using the PC program the user:
can request PLC to OPEN or CLOSE the chamber
is informed of the status of the door being either OPEN or CLOSED
can request PLC to start a process with desired temperature and electromotor speed
is informed of the min/max/average temperature during the process after the process is finished.

It should be understood that the foregoing description is only illustrative of the aspects of the present disclosure. Various alternatives and modifications can be devised by those skilled in the art without departing from the aspects of the present disclosure. Accordingly, the aspects of the present disclosure are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the present disclosure.

Exemplary Header File:

```
typedef struct
{
CONTROL_INTERFACE tControl; // control of slave (PLC) from master (PC)
INFO_INTERFACE tInfo; // info back from slave (PLC) to master (PC)
} PLC_INTERFACE;
typedef struct
{
EQUIPMENT_STATUS tStatus;
PROCESS_RESULT tResult;
} INFO_INTERFACE;
typedef struct
{
BOOL bProcessChamberClosed; // cylinder position sensor (Digital Input)
BOOL bProcessChamberOpen; // cylinder position sensor (Digital Input)
INT16 iMotorPosition; // motor position (Analog Input)
} EQUIPMENT_STATUS;
typedef struct
{
REAL rMinTemperatureDuringProcess; // min temperature during process
REAL rMaxTemperatureDuringProcess; // max temp during process
REAL rAverageTemperatureDuringProcess; // average temp during process
} PROCESS_RESULT;
typedef struct
{
COMMAND tCommand;
PARAMETERS tParameters;
```

```
} CONTROL_INTERFACE;
typedef struct
{
BOOL bOpenProcessChamber; // command to open the process chamber
BOOL bCloseProcessChamber; // command to close the process chamber
BOOL bRunProcess; // command to start a process
} COMMAND;
typedef struct
{
REAL rTargetProcessTemperature; // target temperature during process
REAL rTargetMotorSpeed; // target motor speed during process
} PARAMETERS
```

Exemplary Portions of PC Program Source Code 210 Generated by the PC Program Template 200:

```
public class PLC_INTERFACE : PlcMember
{
public override void SetValue(string memberName, dynamic value)
{
    -   switch(memberName)
    -   {
            1.  case "tControl":
                    a.  tControl = InternalSetValue(memberName,
                        value, tControl);
            2.  break;
            3.  case "tInfo":
                    a.  tInfo = InternalSetValue(memberName,
                        value, tInfo);
            4.  break;
    -   }
}
public override dynamic GetValue(string memberName)
{
    -   switch(memberName)
    -   {
            1.  case "tControl":
                    a.  return tControl;
            2.  case "tInfo":
                    a.  return tInfo;
    -   }
    -   return null;
}
public override T GetValue<T>(string memberName)
{
    -   switch(memberName)
    -   {
            1.  case "tControl":
                    a.  return (T)(object)tControl;
            2.  case "tInfo":
                    a.  return (T)(object)tInfo;
    -   }
return default(T);
}
public CONTROL_INTERFACE tControl = new
CONTROL_INTERFACE( ); // control of slave (PLC) from master (PC)
public INFO_INTERFACE tInfo = new INFO_INTERFACE( ); // info
back from slave (PLC) to master (PC)
}
public class INFO_INTERFACE : PlcMember
{
public override void SetValue(string memberName, dynamic value)
{
    -   switch(memberName)
    -   {
            1.  case "tStatus":
                    a.  tStatus = InternalSetValue(memberName,
                        value, tStatus);
            2.  break;
            3.  case "tResult":
                    a.  tResult = InternalSetValue(memberName,
                        value, tResult);
            4.  break;
    -   }
}
public override dynamic GetValue(string memberName)
{
    -   switch(memberName)
    -   {
            1.  case "tStatus":
                    a.  return tStatus;
            2.  case "tResult":
                    a.  return tResult;
    -   }
    -   return null;
}
public override T GetValue<T>(string memberName)
{
    -   switch(memberName)
    -   {
            1.  case "tStatus":
                    a.  return (T)(object)tStatus;
            2.  case "tResult":
                    a.  return (T)(object)tResult;
    -   }
    -   return default(T);
}
public EQUIPMENT_STATUS tStatus = new
EQUIPMENT_STATUS( );
public PROCESS_RESULT tResult = new PROCESS_RESULT( );
}
```

EQUIPMENT_STATUS and PROCESS_RESULT have the similar style, but are not shown here.

```
public class CONTROL_INTERFACE : PlcMember
{
public override void SetValue(string memberName, dynamic value)
{
    -   switch(memberName)
    -   {
            1.  case "tCommand":
                    a.  tCommand = InternalSetValue(memberName,
                        value, tCommand);
            2.  break;
            3.  case "tParameters":
                    a.  tParameters = InternalSetValue(memberName,
                        value, tParameters);
            4.  break;
    -   }
}
public override dynamic GetValue(string memberName)
{
    -   switch(memberName)
    -   {
            1.  case "tCommand":
                    a.  return tCommand;
            2.  case "tParameters":
                    a.  return tParameters;
    -   }
    -   return null;
}
public override T GetValue<T>(string memberName)
{
    -   switch(memberName)
    -   {
            1.  case "tCommand":
                    a.  return (T)(object)tCommand;
            2.  case "tParameters":
                    a.  return (T)(object)tParameters;
    -   }
    -   return default(T);
}
public COMMAND tCommand = new COMMAND( );
public PARAMETERS tParameters = new PARAMETERS( );
}
```

COMMAND and PARAMETERS have the similar style, but are not shown here.

What is claimed is:

1. A method for controlling a Programmable Logic Controller (PLC) using a personal computer (PC program, wherein a source code of a PLC program includes a data section, the data section including data indicating services to be exposed by the PLC when running the PLC program, the method comprising:

automatically generating a source code of the PC program using the data included in the data section and a PC program template, wherein the PLC is controlled using the PC program generated from the automatically generated source code of the PC program.

2. The method according to claim 1, wherein the PC program template is a text template.

3. The method according to claim 1, wherein the data section is a header of the source code of the PLC program.

4. The method according to claim 1, wherein the source code of the PLC program is a high-level programming language.

5. The method according to claim 1, wherein the PC program is configured to show a graphical user interface when run on a PC.

6. The method according to claim 1, wherein the services to be exposed by the PLC comprise at least one service for writing data to the PLC and/or at least one service for reading data from the PLC.

7. The method according to claim 6, wherein controlling the PLC using the PC program comprises writing values to the PLC and/or reading values from the PLC.

8. The method according to claim 6, wherein controlling the PLC using the PC program comprises receiving information from the PLC and/or sending commands to the PLC.

9. The method according to claim 1, wherein the services are exposed by the PLC using a server running on the PLC.

10. The method according to claim 1, wherein the PLC is running the PLC program.

11. A method for automatically creating a PC program for controlling a PLC, comprising;

automatically generating a source code of the PC program using data included in a data section of a source code of a PLC program and a PC program template, wherein the data section includes data indicating services to be exposed by the PLC when running the PLC program.

12. A computer which is, in particular programmatically, adapted to perform a method according to claim 1.

13. A non-transitory machine-readable storage medium having stored thereon a computer program to perform the method according to claim 1.

* * * * *